United States Patent Office 3,756,771
Patented Sept. 4, 1973

3,756,771
COMPOSITE CHROMIUM-COMPLEX AZO DYES
Fabio Beffa, Basel, Switzerland, assignor to
J. R. Geigy AG, Basel, Switzerland
No Drawing. Continuation of abandoned application Ser.
No. 766,031, Oct. 3, 1968. This application Jan. 22,
1971, Ser. No. 108,991
Claims priority, application Switzerland, Oct. 9, 1967,
14,065/67
Int. Cl. C09b 45/26
U.S. Cl. 8—26                   9 Claims

ABSTRACT OF THE DISCLOSURE

Composite dyes which are mixtures of 1:2 chromium complex dyestuffs of two different types in a weight ratio of the first to the second type in the range of from about 4:1 to 1:4, which dyestuffs are each composed of a naphthalene-azo-naphthalene monazo dyestuff moiety and of a naphthalene-azo-benzene-azo-naphthalene or benzene-azo-benzene-azo-naphthalene disazo dyestuff moiety linked together by the complexing chromium atom, dyestuffs of the first type having a sole sulphonic acid group in free or preferably in salt form in the monazo moiety, while the second type must have two and not more such sulphonic acid groups in the complex molecule, one of which is in the monoazo moiety while the second one is linked to a naphthalene nucleus of the monoazo moiety or to one of the two terminal aryl groups of the disazo moiety, and dye compositions containing them together with diluents and/or dispersing agents are disclosed as useful for the dyeing and for the printing of polyamide materials especially from acid media. A process for coloring polyamide materials with the aid of such composite dyes and dye compositions as well as polyamide materials dyed therewith are also described.

---

This is a continuation of application Ser. No. 766,031, filed Oct. 3, 1968, now abandoned.

This invention relates to novel composite 1:2 chromium complex azo dyes, to dye compositions containing the same and to processes for colouring polyamide materials, especially polyamide fibre materials, therewith in black shades as well as to polyamide materials dyed with the said composite dyes.

Composite dyes for coloring polyamide material in black shades are known which consist of dyestuff mixtures produced by reacting a mixture of a monoazo and a disazo dyestuff with a chromium-yielding compound. Such dyestuff mixtures suffer, however, from certain drawbacks. Especially, in the production of acetate rayon effects on wool or synthetic polyamide fibres, they do not reserve the rayon satisfactorily. On the other hand, black chromium complex dyestuffs are known which are not sufficiently stable to acid media, especially when used for the printing, and particularly the Vigoureux printing of wool or nylon, the resistance to acid media being an essential prerequisite for avoiding precipitation of the dyestuff and coagulation of the printing pastes.

The present invention provides novel composite dyes which are free from these drawbacks and are unexpectedly resistant to acid media and hence very suitable for the printing of polyamide fibre materials, but also for the continuous and exhaustion dyeing of such materials and also for the brush-dyeing of leather.

These composite dyes according to the invention consist essentially of mixtures of one or several dyestuffs of a first type, which fall under the formula

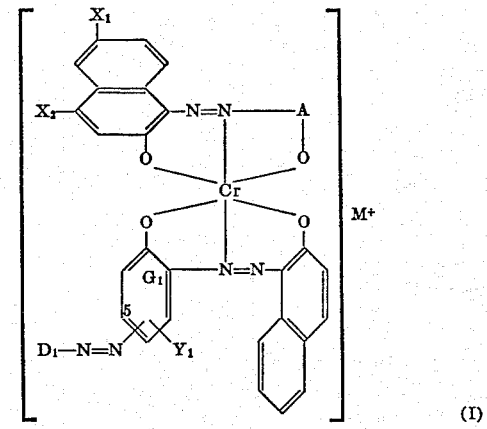

(I)

and one or several dyestuffs of a second type which fall under the formula (II)

the weight ratio of dyestuff of the first type to dyestuff of the second type ranging from about 4:1 to 1:4, and preferably from about 2:1 to 1:2 in the above formulae:

A and B each represent a 1,2-naphthylene radical, $D_1$ and $D_2$ each represent a phenyl or an $\alpha$- or $\beta$-naphthyl radical, $X_1$ represents hydrogen, nitro, halogen, or, if $X_2$ represents hydrogen, $X_1$ represents —$SO_3^-M^+$, $X_2$ represents —$SO_3^-M^+$, if $X_1$ represents —$SO_3^-M^+$, $X_2$ represents hydrogen, $X_3$ represents hydrogen, nitro, halogen or —$SO_3^-M^+$, $X_4$ and W each represent hydrogen or —$SO_3^-M^+$ with the proviso that two of $X_3$, $X_4$ and W must represent —$SO_3^-M^+$, W being linked to any of the naphthalene radicals or to $D_2$, $Y_1$ and $Y_2$ each represent hydrogen or they each represent lower alkyl, lower alkoxy or hydroxyethoxy linked in 4-position, with the proviso that, when $Y_1$ and/or $Y_2$ represent hydrogen, $D_1$—N=N— and/or $D_2$—N=N are linked in 4-position to the benzene nucleus $G_1$ or $G_2$, and when $Y_1$ and/or $Y_2$ represent lower alkyl, lower alkoxy or hydroxyethoxy linked in 4-position, $D_1$—N=N— and/or $D_2$—N=N— are linked in 5-position to the benzene nucleus $G_1$ or $G_2$, respectively, $M^+$ represents one equivalent of a non-color-imparting cation, preferably one equivalent of a lithium, sodium, potassium or ammonium cation, and any substituent of the radicals $D_1$ and $D_2$, in the case of the latter apart from any group W present therein, is selected from halogen, cyano, nitro, lower alkyl, trifluoromethyl, lower alkoxy, lower alkylthio, mononuclear aryloxy, mononuclear arylthio, lower alkanoyl, lower alkyl-sulphonyl, mononuclear arylsulphonyl, or a sulphamoyl group the nitrogen atom of which is unsubstituted or substituted by one or two aliphatic, cycloaliphatic, mono- or dinuclear carbocyclic-aromatic or araliphatic radicals, the last-mentioned sulphamoyl group being preferably of the formula

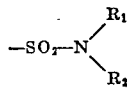

wherein $R_1$ represents hydrogen, lower alkyl, hydroxy-lower alkyl, phenyl, benzyl or cyclohexyl, and $R_2$ represents hydrogen, lower alkyl or hydroxy-lower alkyl.

Preferred composite dyes according to the invention which are readily producible, are those of dyestuffs falling under Formulae I and II in which each of $X_1$ and $X_3$ represents hydrogen, nitro or halogen, and each of $X_2$, $X_4$ and W represents —$SO_3^-M^+$.

More preferred composite dyes according to the invention which are distinguished by affording fast black dyeings on polyamide fibre materials and very stable printing pastes, even when such pastes are of acid pH value, are mixtures of a dyestuff of Formula I and a dyestuff of Formula II, wherein each of $D_1$ and $D_2$ is a phenyl radical, each of $D_1$—N=N— and $D_2$—N=N— is linked to the adjacent benzene nucleus $G_1$ or $G_2$ in 4-position, the substituent W is linked to $D_2$, each of the 1,2-naphthylene radicals A and B is linked with its 1-position to the adjacent azo bridge, each of $X_1$ and $X_3$ represents hydrogen or nitro, each of $X_2$, $X_4$ and W represents —$SO_3^-M^+$, each of $Y_1$ and $Y_2$ represents hydrogen and any substituent of $D_1$ is selected from alkyl of at most 2 carbon atoms, alkoxy of at most 2 carbon atoms, chlorine, bromine or fluorine, the weight ratio of dyestuff of Formula I to dyestuff of Formula II ranging from about 2:1 to 1:2.

Halogen substituents in the dyestuffs of Formulae I and II are fluorine, bromine or, preferably chlorine atoms. "Lower" when used in connection with alkyl, alkoxy or alkylthio groups means that such group has at most 4 carbon atoms, in connection with "alkanoyl" it means that the latter group has at most 5 carbon atoms, and preferably from 2 to 3 carbon atoms. All sulphonic acid groups present in the molecules of the dyestuffs of Formulae I and II are preferably in the form of the lithium, sodium, potassium or ammonium salts.

An important feature distinguishing the dyestuffs of Formula I in the composite dyes according to the invention from those of Formula II is that, in those of the first type, there is only one sulphonic acid group present per molecule and that such group is linked as $X_1$ or $X_2$ to the one naphthalene nucleus of the monoazo moiety of the complex dyestuff; in those of the second type, on the other hand, there must be two sulphonic acid groups one of which must be linked to the one naphthalene nucleus of the monoazo moiety, as substituent $X_3$ or $X_4$, and the second sulphonic acid group, W, is linked to the same or to the other naphthalene nucleus B of the aforesaid monoazo moiety, or to the naphthalene nucleus E, or to the grouping $D_2$ of the disazo moiety of the complex dyestuff of type II, preferably however, to B, $D_2$ or E, and most preferably to $D_2$.

The number and position of the sulphonic acid groups in the two types of dyestuffs is critical for obtaining satisfactory fast black dyeings on polyamide fibres and good stability in acid media.

Dye preparations produced from the composite dyes according to the invention, particularly Vigoureux printing pastes, are distinguished over the dye preparations obtained from dyestuff of type I alone under otherwise the same conditions, by their superior stability to an acid content or to acid media, in pH values down to 3.5 or lower.

As compared with dye preparations containing dyestuff of type II only, dye preparations obtained with the composite dyes according to the invention are distinguished by superior affinity to the polyamide fibres and by better fastnesses to wet processing, such as an improved fastness to perspiration.

The invention further relates to a process for coloring polyamide material by dyeing or printing the same with the aid of baths, pad liquors or printing pastes comprising composite dyes according to the invention in a sufficient amount to impart to said material a black shade of desired depth.

Black dyeings or prints on polyamide fibres, particularly on wool, attained according to the invention are distinguished by deep and level shades and good fastness properties. They have remarkable light, rubbing and, mainly, wet fastness properties, e.g. fastness to water, sea water, washing, milling and perspiration.

Another advantage of the composite dyes according to the invention is that they are suitable for the brush-dyeing of leather, e.g. glove leather, in the presence of acids. This is possible only because of their great stability to acid.

Polyamide materials suitable for such coloring processes are leather and, particularly textile materials containing or consisting of natural polyamide fibres, such as silk or, particularly, wool, or of synthetic polyamide fibres, such as the polycondensation products from adipic acid and hexamethylenediamine known as nylon 66, or polymerisation products of ε-caprolactam which are known as nylon 6 and are commercially available under such trade names as Perlon, Grilon, Mirlon, or polymerisation products of ω-amino-undecanoic acid known as nylon 11 and commercially available under the trade name of Rilsan, mixed condensation products, e.g. those of hexamethylenediamine, adipic acid and ε-caprolactam (nylon 6/66), and polycondensation products of hexamethylenediamine and sebacic acid known as nylon 610. The preferred polyamide fibre material suitable for coloring by the process according to the invention is wool.

The polyamide material can be dyed or printed according to the invention in any form desired. For example, it can be dyed in the form of flocks, slubbing (tops), tow, yarn or fabric, or printed especially in the form of fabric.

The process of this invention is particularly suitable for the coloring of polyamide fabric with acetate rayon effects, the acetate rayon portion of the fabric being well reserved thereby.

The dyeing of polyamide fibres, which also comprises pad-dyeing, can be performed by methods known per se with a dye composition which, in addition to the composite dye as defined, comprises a diluting agent or a surfactant acting as wetting and/or dispersing agent as well as other auxiliaries usual in polyamide dyeing, e.g. salts such as sodium sulphate or ammonium sulphate and/or dilute acids, e.g. acetic acid or formic acid.

Suitable anionic surfactants are for example, condensation products of formaldehyde and naphthalene sulphonic acid, sulphated or sulphonated higher aliphatic fatty acids having, preferably, 8 to 20 carbon atoms or salts and esters thereof, aromatic sulphonic acids which, optionally, are substituted by straight or branched chain alkyl radicals having up to 20 carbon atoms, or mixtures of these sulphonic acids or salts; also sulphated polyglycol ethers of higher alcohols or higher alkylated phenols with ethylene oxide or propylene oxide.

Suitable non-ionogenic auxiliaries are, particularly, surface active ethylene oxide addition products of organic hydroxyl, carboxyl, amino or amido compounds having aliphatic hydrocarbon radicals containing, in all, at least 8 carbon atoms, or mixtures of such substances.

Preferably, the dyestuff mixtures usable according to the invention are applied to polyamide fibres by printing. Typical dye compositions suitable for use as printing inks are pastes containing composite dye according to the invention in sufficient amount to impart to the treated polyamide material a black shade of desired depth, sufficient acid to give the paste a pH between about 3.5 and 7.0, preferably about 6.0, surfactants mentioned above which act as dispersing and/or wetting agents as well as conventional thickeners such as the products known in textile printing, particularly soluble types of gum such as so-called "crystal gum," also however, thickeners having a cellulose basis such as locust bean fluor, galactomannan, tragacanth, Solvitose, British gum. In a weakly alkaline medium also water soluble salts of alginic acids can be used. Cellulose derivatives such as methyl cellulose or soluble salts of carboxymethyl cellulose can also be used. Care should be taken, however, that the thickeners do not cause precipitations under the application conditions. Lower fatty acids such as formic acid and, chiefly, acetic acid are used to give the paste an acid pH.

As further additives a dye composition according to the invention suitable as printing paste can also contain alcohols, particularly alkanols of at most 4 carbon atoms such as methanol, ethanol or isopropanol, glycols such as ethylene or propylene glycol, diethylene glycol or thiodiethylene glycol, or triols such as glycerin, carbonic and thiocarbonic acid amides, particularly urea, as well as sodium-3-nitrobenzene sulphate or aqueous emulsions of sulphonated oils.

The printing of the polyamide fibre material and also the steaming of the printed goods can be carried out by methods known per se. Advantageously the printing paste is applied to the goods, preferably in the form of fabrics and yarns, by printing with printing die, spraying apparatus, stencil plate, screen printing or printing roller, whereupon the printed material is dried and, if desired, steamed, either at atmospheric pressure or in a closed vessel under excess pressure if—depending on the type of fibre—a temperature of over 100° C., e.g. between 110 and 130° C. is required.

After the polyamide fibre material has been dyed or printed, the treated material is advantageously rinsed, e.g. with cold or warm water, which can contain the auxiliaries usual in wool dyeing, e.g. formic acid or acetic acid, or also wetting or wash-active substances.

Chromium complexes of Formulae I and II usable according to the invention can be produced individually by known methods, especially by the procedure described in U.S. Pats. 2,933,488 and 2,933,489 granted on Apr. 19, 1960, and then mixed in the desired ratios before isolation. The dyestuff mixture is then isolated by salting out, e.g. with sodium or potassium or ammonium chloride, or by spray drying. It is also possible to produce this mixture of dyestuffs by purely mechanical mixing of the isolated dyestuffs of Formulae I and II. For this purpose, the dyestuffs can be worked up in the desired ratio into a mixture in a suitable apparatus, e.g. a ball mill.

According to the process described in the aforesaid patents one of the two dyestuffs from which the 1:2 chromium complex is to be built up, preferably the monoazo dyestuff, is reacted with a chromium-yielding compound to form the corresponding 1:1 chromium complex dyestuff, and the latter complex dyestuff is then reacted with the second dyestuff, preferably the disazo dyestuff.

In order to produce mixtures of the first type and the second type dyestuffs in predetermined ratios, a single monoazo dyestuff or a mixture of two or three or more monoazo dyestuffs in desired proportions are first reacted with the chromium-yielding compound to form the corresponding 1:1 chromium monoazo complex dyestuff or mixture of such 1:1 complex dyestuff, and then this 1:1 complex or 1:1 complex dyestuff mixture, directly as obtained from the complexing reaction, is further reacted with a single disazo dyestuff or with a mixture of disazo dyestuffs in the desired proportions.

In this manner, it is possible to obtain a final mixture of first type and second type 1:2 chromium complex dyestuffs constituting a composite dye according to the invention.

Chroming to form the 1:1 chromium complexes is performed by known methods, e.g. by treating a metal-free azo dyestuff with the equimolecular amount or an excess of a suitable chromium salt, e.g. chromium-(III)-formate, chromium-(III)-acetate, chromium-(III)-fluoride or chloride. This treatment is performed in aqueous or organic-aqueous solution or suspension, and also in an organic solvent, advantageously at temperatures of 90–150° C., optionally under pressure and, preferably, in an acid medium, e.g. in the presence of formic or acetic acid.

Suitable solvents are, e.g. amides or lower fatty acids such as formamide or dimethyl formamide, alcohols such as alkanols or alkylene glycols, e.g. ethylene glycol, lower monoalkyl ethers thereof as well as mixtures thereof. If an o-alkoxy-o'-hydroxyazo dyestuff for example, is used as starting material, then the metallisation is to be performed under such conditions, e.g. at temperatures of 120–140° C., that the alkyl group is split off from the o-alkoxy-o'-hydroxy azo grouping.

The 1:1 chromium complex of a metallised azo dyestuff to which the metal-free azo dyestuff is added, can contain, depending on the way it is produced and the reaction medium, further ligands at the chromium atom. Such complexes can be, e.g. aquo, acido or hydroxo complexes of the chromium-containing dyestuff. The 1:1 chromium complex can also contain chelated ligands which can be displaced by the second azo dyestuff which chelates dicyclically such as is the case, e.g. with the salicylate or tartrate compounds of metal-containing azo dyestuffs containing one chromium atom per dyestuff molecule.

The metal-free azo dyestuffs are added to the 1:1 chromium complex compounds, e.g. in a weakly acid, neutral or, advantageously, alkaline medium at a slightly raised temperature, e.g. 40° to 95° C. The reaction is advantageously performed in aqueous or organic, e.g. alcoholic, medium and, preferably in the presence of mineral acid buffering or alkaline agents such as sodium acetate, sodium carbonate, sodium hydroxide or the corresponding potassium, lithium or ammonium compounds. The addition process described can also be performed in aqueous-organic medium, e.g. in aqueous ethylene glycol, ethylene glycol monomethyl ether, diethylene glycol or aqueous amides of lower fatty acids, e.g. acetamide, formamide or dimethyl formamide. In most cases the addition takes place quickly and completely. If an azo dyestuff is used which can be metallised dicyclically and which contains an alkoxy group in a position adjacent the azo bond, then the addition is performed under conditions in which the alkoxy group is dealkylated. In this case the reaction is advantageously performed in organic solvents, e.g. in formamide, dimethyl formamide or diethylene glycol, at 120 to 160° C.

The 1:2 chromium complex compounds can be obtained from aqueous or aqueous-organic solutions, e.g. by salting out and from organic solutions by precipitation with water or sodium chloride solution or by distilling off the organic solvent. The dyestuffs can be isolated directly by the spray drying method also.

The invention is further illustrated by the following non-limitative examples, in which all temperatures are given in degrees centigrade, and all percentages are by weight unless expressly stated otherwise.

EXAMPLE 1

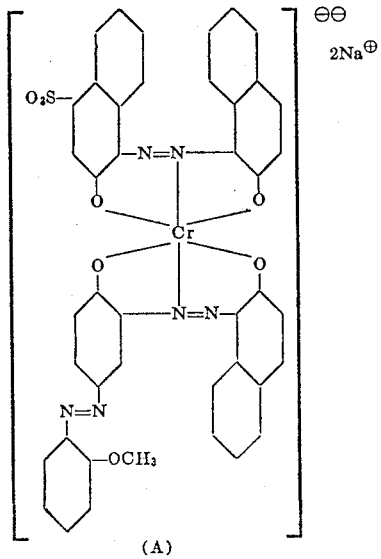

(A)

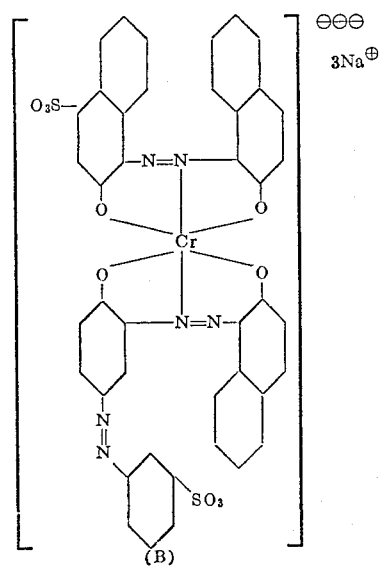

(B)

20 g. of a dyestuff mixture containing 12.1 g. of monosulphonated dyestuff A and 7.9 g. of disulphonated dyestuff B of the above constitution, in the form of their sodium salts, are slurried with 60 g. of urea and 50 ml. of cold water. 300 ml. of boiling water are poured in and 50 g. of thiodiethylene glycol, 400 g. of crystal gum aqueous solution, 40 g. of glycerin and 15 g. of 80% acetic acid are added. The mixture obtained is made up to 1000 g. with water. Wool muslin or wool slubbing is printed with the paste so obtained, steamed and washed in the usual way. Full, black, wet and light fast prints are obtained.

Prints having similar properties are obtained if, with otherwise the same procedure, instead of the 20 g. of the dyestuff mixture mentioned in the first paragraph, 20 g. of the dyestuff mixture consisting of 12.1 g. of sodium salt of the monosulphonated dyestuff of the above constitution A and 7.9 g. of sodium salt of the disulphonated dyestuff B having an o- or p-sulphophenyl azo group instead of the m-sulphophenyl azo group, are used.

The dyestuff mixture described in the first paragraph can be produced, e.g., as follows:

24.9 g. of the disazo dyestuff obtained from diazotised 4-hydroxy-3-amino - 2' - methoxyazobenzene and 2-hydroxynaphthalene are suspended at about 60° with 16.8 g. of the disazo dyestuff obtained from diazotised 4-hydroxy-3-amino-azobenzene - 3' - sulphonic acid and 2-hydroxynaphthalene, in 600 ml. of water and 40 g. of calcined soda.

44.4 g. of the 1:1 chromium complex compound corresponding to 5.2 g. of chromium and 39.4 g. of monoazo dyestuff obtained from diazotised 1-amino-2-hydroxynaphthalene-4-sulphonic acid and 2-hydroxynaphthalene are then added.

The mixture is heated for 1 hour at 80–85° whereupon a black colored suspension which can easily be stirred is formed. The dyestuff mixture formed is then salted out with sodium chloride, filtered off and dried.

In the above as well as in the following examples, the dyestuff mixture can also be salted out with lithium, potassium or ammonium chloride or isolated by spray drying after adjusting the pH of the suspension to 7 by the addition of hydrochloric acid.

EXAMPLE 2

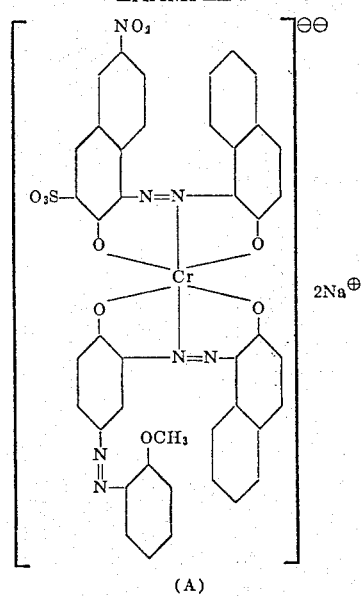

(A)

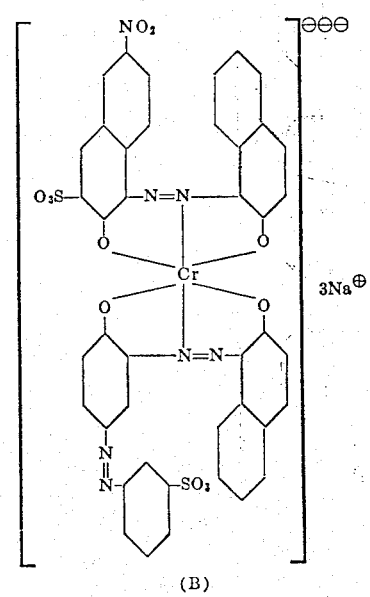

(B)

Wool muslin or slubbing is printed in the usual way with a printing paste of the following constitution: 9.6 g. of the monosulphonated dyestuff A and 10.4 g. of the disulphonated dyestuff B corresponding to the above constitutions, in the form of their sodium salts, 60 g. of urea, 50 g. of thiodiethylene glycol, 400 g. of crystal gum aqueous solution, 40 g. of glycerin and 20 g. of 80% acetic acid in 1000 g. of water.

After fixing the dyestuff by steaming and after washing, very valuable black prints having good wet fastness and very good light fastness properties are obtained.

Prints having similar properties and shades are obtained if, with otherwise the same procedure, instead of the above dyestuff mixture, a mixture consisting of 9.7 g. of sodium salt of the monosulphonated dyestuff of the above constitution A and 10.3 g. of sodium salt of the disulphonated dyestuff of above constitution B which, instead of the 6-nitro-4-sulpho-2-hydroxynaphthalene-1-azo group contains the 6-chloro-4-sulpho-2-hydroxynaphthalene-1-azo group, is used.

The dyestuff mixture described in the first paragraph can also consist of 9.5 g. of sodium salt of the monosulphonated dyestuff of above constitution A and 10.5 g. of sodium salt of the disulphonated dyestuff B which, instead of the 6-nitro-4-sulpho - 2 - hydroxynaphthalene-1-azo group, contains the 6-bromo-4-sulpho - 2 - hydroxynaphthalene-1-azo group.

The above dyestuff mixtures can be produced as follows:

19.9 g. of the disazo dyestuff obtained from diazotised 4-hydroxy-3-amino-2'-methoxyazobenzene and 2-hydroxynaphthalene is suspended at about 60° with 22.4 g. of the disazo dyestuff obtained from diazotised 4-hydroxy-3-amino-azobenzene-3'-sulphonic acid and 2-hydroxynaphthalene, and 40 g. of calcined soda in 600 ml. of water.

To this are added 48.9 g. of the 1:1 chromium complex compound corresponding to 5.2 g. of chromium and 43.9 g. of monoazo dyestuff obtained from diazotised 6-nitro-1-amino-2-hydroxynaphthalene - 4 - sulphonic acid and 2-hydroxynaphthalene, or 47.9 g. of the 1:1 chromium complex compound corresponding to 5.2 g. of chromium and 42.85 g. of moonazo dyestuff obtained from diazotised 6-chloro-1-amino-2-hydroxynaphthalene - 4 - sulphonic acid and 2-hydroxynaphthalene, or 52.3 g. of the 1:1 chromium complex compound corresponding to 5.2 g. of chromium and 47.3 g. of monoazo dyestuff obtained from diazotised 6 - bromo-1-amino-2-hydroxynaphthalene-4-sulphonic acid and 2-hydroxynaphthalene.

The mixtures are heated for 1 hour at 80–85°, whereupon black colored suspensions which can be stirred well are formed. The dyestuff mixtures formed are salted out with sodium chloride, filtered off and dried.

The chromium complexes A and B described in the first paragraph of the example can also be produced by known methods by adding individually the corresponding disazo dyestuffs to the 1:1 chromium complex compound of the monoazo dyestuff from diazotised 6-nitro-2-hydroxy-1-aminonaphthalene-4-sulphonic acid and 2-hydroxynaphthalene. The obtained chromium complexes A and B are then put individually into the printing paste in the desired ratios.

EXAMPLE 3

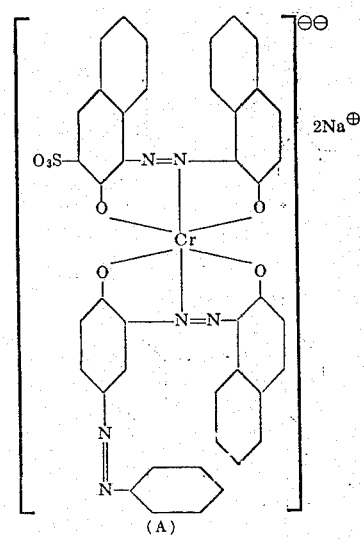

(A)

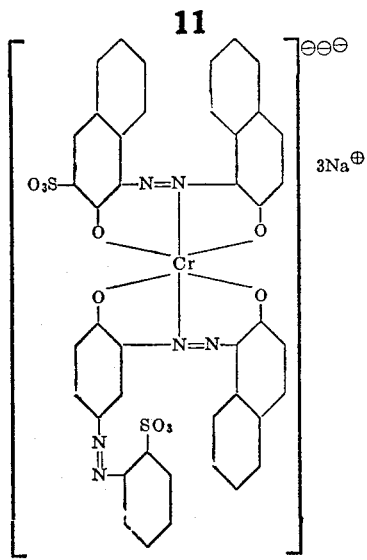

(B)

12.45 g. of monosulphonated chromium complex dyestuff corresponding to Formula A and 7.55 g. of disulphonated chromium complex dyestuff corresponding to Formula B, in the form of their sodium salts, are slurried with 60 g. of urea and 50 ml. of cold water.

300 ml. of boiling water are poured in and 50 g. of thiodiethylene glycol, 400 g of crystal gum aqueous solution, 40 g. of glycerin and 15 g. of 80% acetic acid are added. The mixture is then made up to 1000 g. with water. Combed wool can be printed with this printing paste. After a subsequent steaming and after washing thereof, black prints are obtained which have excellent fastness properties, particularly excellent light and wet fastness.

The above paste is well suited for the Vigoureux printing. The same preparation, however, can also be used for padding animal fibres in the foulard. Similar prints are obtained if, with otherwise the same procedure, instead of the 20 g. of the dyestuff mixture mentioned in the first paragraph, 12.45 g. of the sodium salt of the dyestuff corresponding to the above constitution A and 7.55 g. of sodium salt of the disulphonated dyestuff B which has an m- or p-sulphophenyl azo group instead of the o-sulphophenyl azo group, are used.

The dyestuff mixtures mentioned can be produced individually or direct in admixture by known methods, e.g. by addition of the corresponding metal-free disazo dyestuffs to the 1:1 chromium complex compound of the monoazo dyestuff which is obtained from diazotised 1-amino-2-hydroxynaphthalene-4-sulphonic acid and 2-hydroxynaphthalene.

EXAMPLE 4

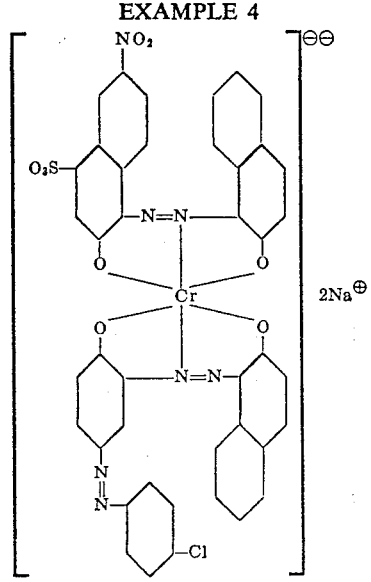

(A)

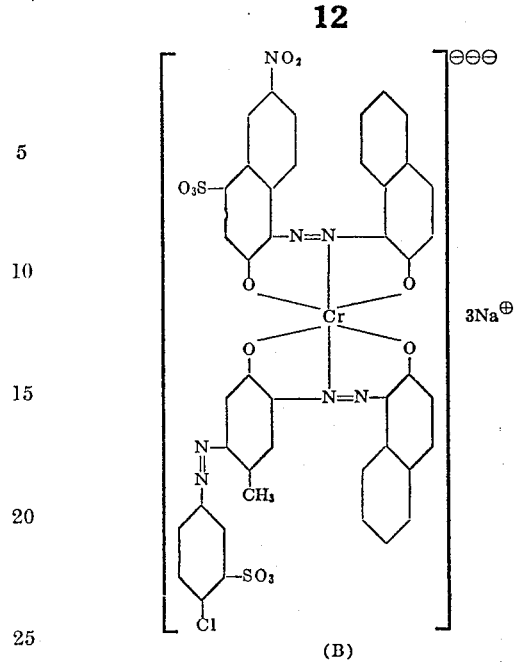

(B)

Wool, silk or synthetic polyamide fabrics or mixtures of animal fibres with synthetic polyamide fibres can be printed by the usual printing process with an aqueous printing paste which, in 1000 g. of water, contains 14.5 g. of the monosulphonated chromium complex dyestuff corresponding to Formula A and 5.5 g. of the disulphonated chromium complex dyestuff corresponding to Formula B, in the form of their sodium salts, 60 g. of urea, 50 g. of thiodiethylene glycol, 400 g. of crystal gum solution, 40 g. of glycerin and 15 g. of 80% formic acid. The black prints obtained have high grade fastness properties.

Similar prints with equally good properties are obtained if a printing paste is used containing 14.6 g. of the sodium salt of the monosulphonated chromium complex dyestuff corresponding to Formula A and 5.4 g. of the sodium salt of the disulphonated chromium complex dyestuff corresponding to Formula B which, instead of a 4-chloro-3-sulphophenyl azo group, has a 4-methoxy-3-sulphophenyl azo group.

The chromium complex dyestuffs are produced by known methods by addition of the corresponding disazo dyestuffs to the 1:1 chromium complex compound which is obtained by chroming the monoazo dyestuff obtained from diazotised 6-nitro-1-amino-2-hydroxynaphthalene-4-sulphonic acid and 2-hydroxynaphthalene.

Black dyeings of similar quality are obtained on polyamide fibres, particularly on wool when, with otherwise the same procedure, instead of the dyestuff mixtures mentioned in Examples 1 to 4, a dyestuff mixture is used which consists of the components A and B mentioned in the following table in the amounts given in column 4 of the table and which is produced by the methods described in Examples 1 to 4, optionally using, however, potassium chloride instead of sodium chloride for salting out the dyestuffs.

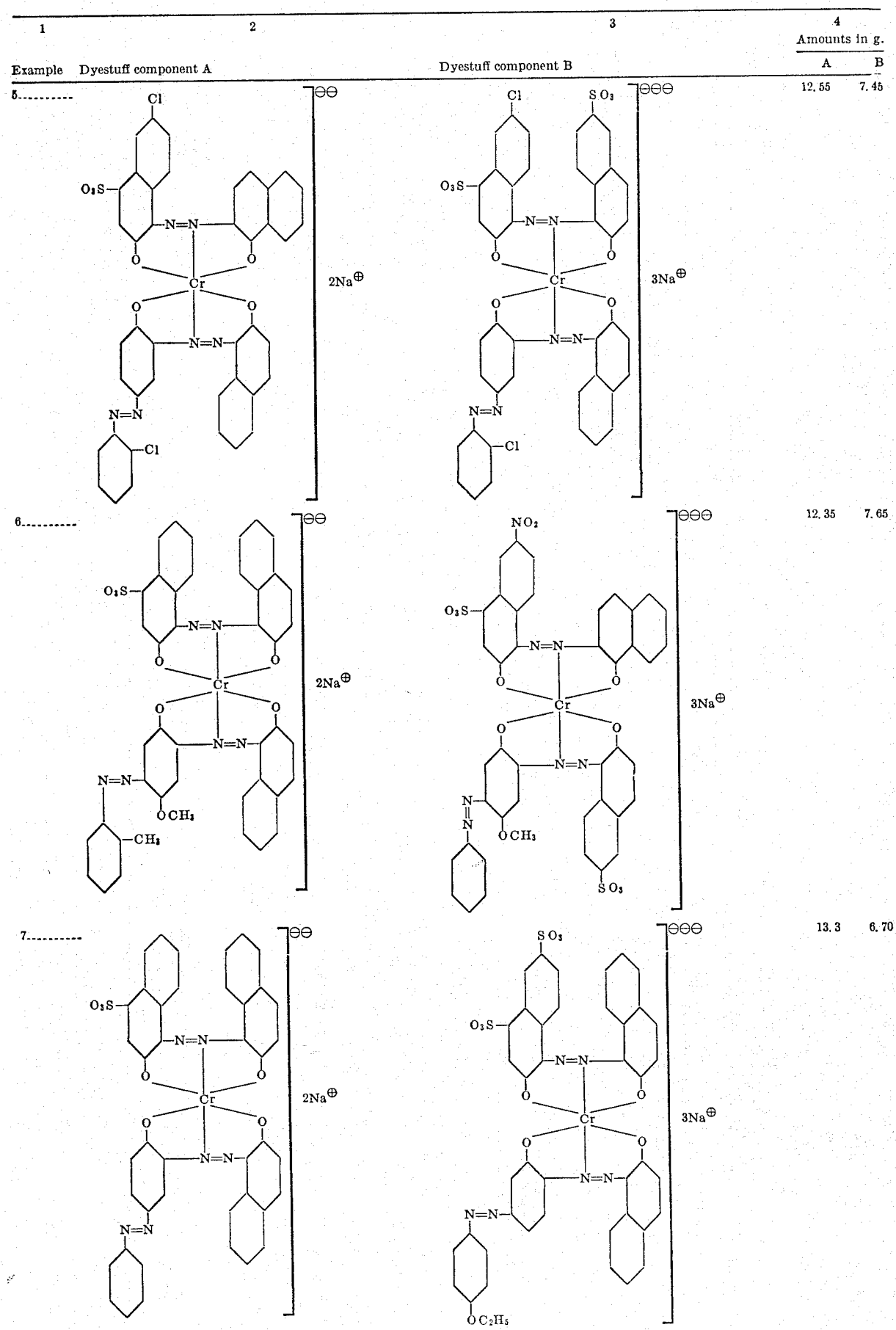

TABLE—Continued

| Example | Dyestuff component A | Dyestuff component B | Amounts in g. A | B |
|---|---|---|---|---|
| 8 | (chromium complex structure, 2Na⊕) | (chromium complex structure, 3Na⊕) | 11.3 | 8.7 |
| 9 | (chromium complex structure, 2Na⊕) | (chromium complex structure, 3Na⊕) | 12.65 | 7.35 |
| 10 | (chromium complex structure, 2Na⊕) | (chromium complex structure, 3Na⊕) | 10.7 | 9.3 |

TABLE—Continued
| Example | Dyestuff component A | Dyestuff component B | Amounts in g. A | B |
|---|---|---|---|---|
| 11 | 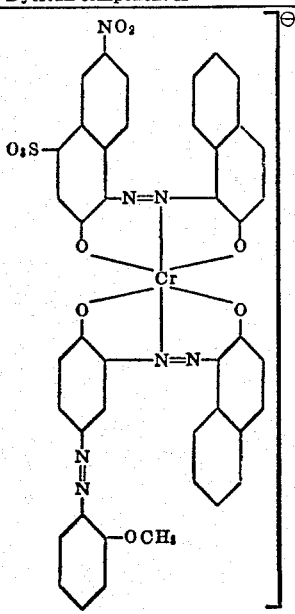 2Na⊕ | 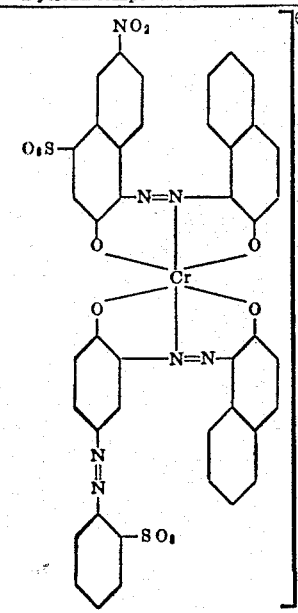 3Na⊕ | 12.65 | 7.35 |
| 12 | 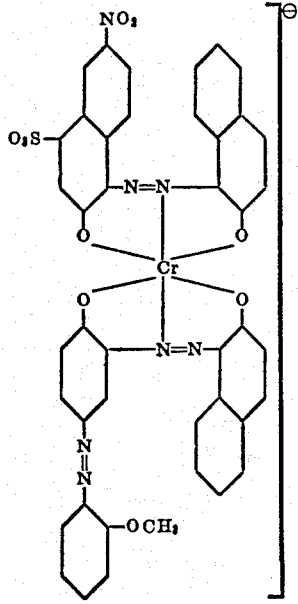 2Na⊕ | 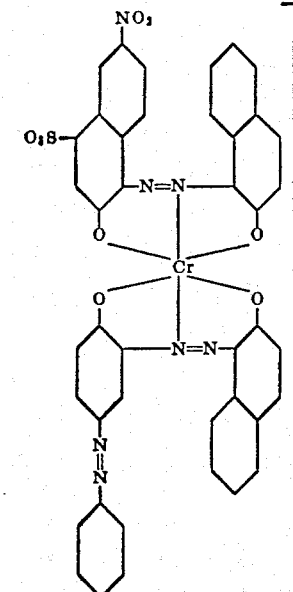 3Na⊕ | 12.65 | 7.35 |
| 13 | 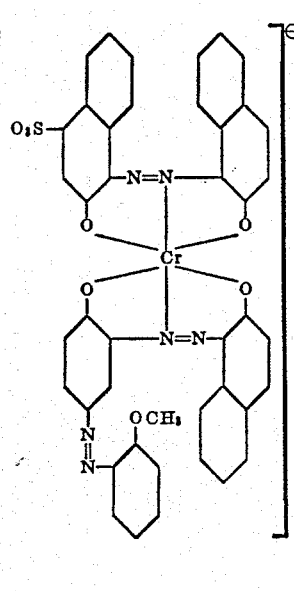 2Na⊕ | 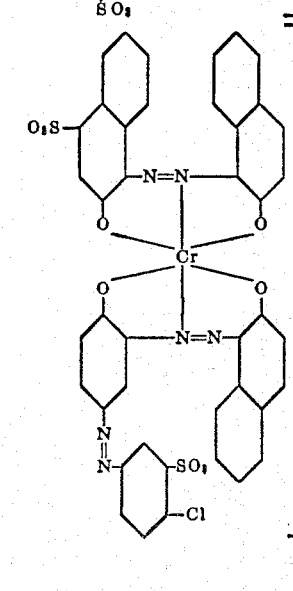 2Na⊕ | 12.5 | 7.5 |

TABLE—Continued
| Example | Dyestuff component A | Dyestuff component B | Amounts in g. A | B |
|---|---|---|---|---|
| 14 | 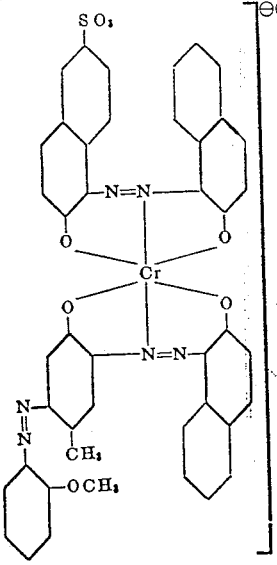 | 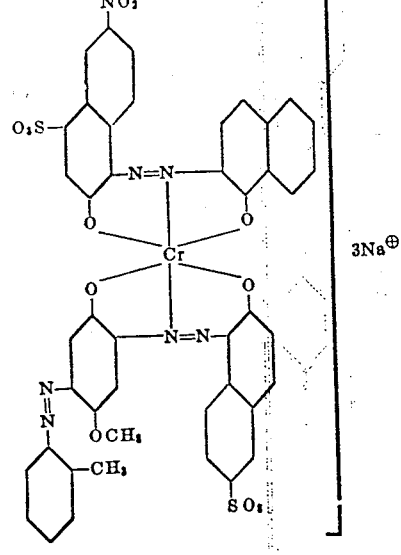 | 11.3 | 8.7 |
| 15 | 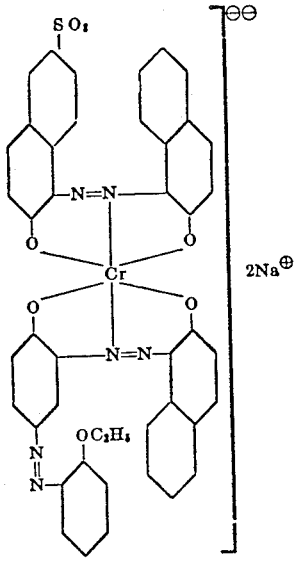 | 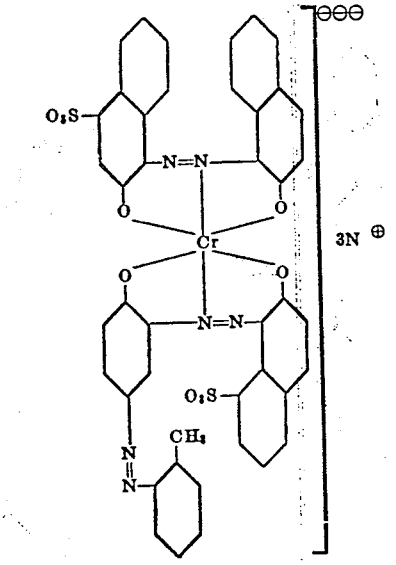 | 12.65 | 7.35 |
| 16 | 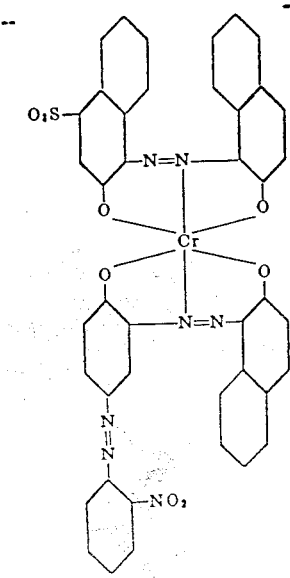 | 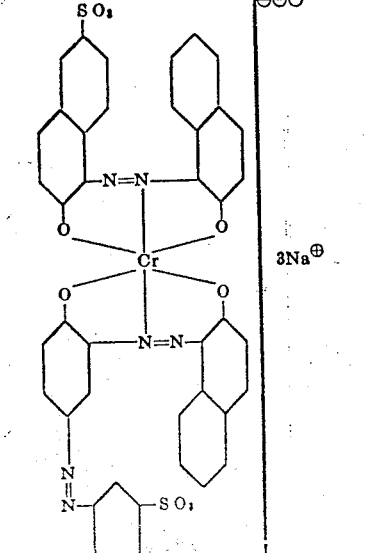 | 10.7 | 9.3 |

TABLE—Continued

| Example | Dyestuff component A | Dyestuff component B | Amounts in g. A | Amounts in g. B |
|---|---|---|---|---|
| 17 | [structure] | [structure] | 13.35 | 6.65 |
| 18 | [structure] | [structure] | 6.65 | 13.35 |
| 19 | [structure] | [structure] | 16.0 | 4.0 |

TABLE—Continued

| Example | Dyestuff component A | Dyestuff component B | Amounts in g. A | B |
|---|---|---|---|---|
| 20 | (chromium complex azo dye structure with $O_3S$, $OC_2H_7$, CN substituents) $2Na^\oplus$ | (chromium complex azo dye structure with $O_3S$, $OCH_2CH_2OH$, $OCH_3$, $SO_3$ substituents) $3Na^\oplus$ | 4.0 | 16.0 |
| 21 | (chromium complex azo dye structure with $O_3S$, phenoxy substituent) $2Na^\oplus$ | (chromium complex azo dye structure with $O_3S$, $CF_3$, $SO_3$ substituents) $3Na^\oplus$ | 12.0 | 8.0 |
| 22 | (chromium complex azo dye structure with $O_3S$, phenylthio substituent) $2Na^\oplus$ | (chromium complex azo dye structure with $O_3S$, phenoxy, $SO_3$ substituents) $3Na^\oplus$ | 8.0 | 12.0 |

TABLE—Continued
| Example | Dyestuff component A | Dyestuff component B | Amounts in g. A | B |
|---|---|---|---|---|
| 23 | 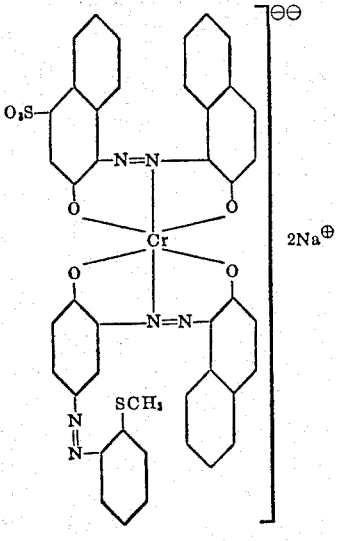 | 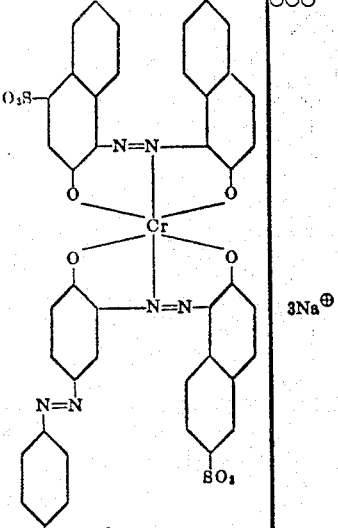 | 12.5 | 7.5 |
| 24 | 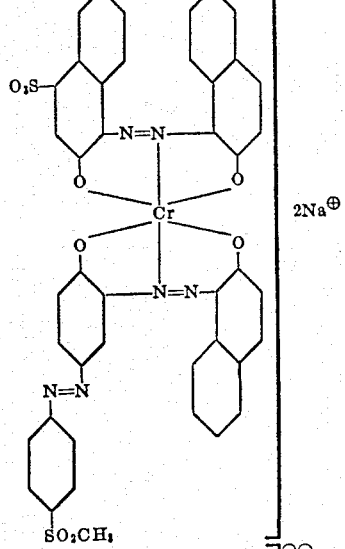 | 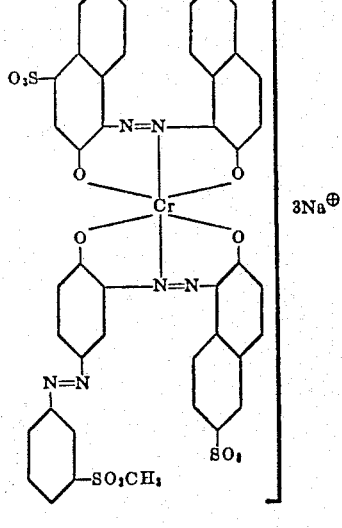 | 13.0 | 7.0 |
| 25 | 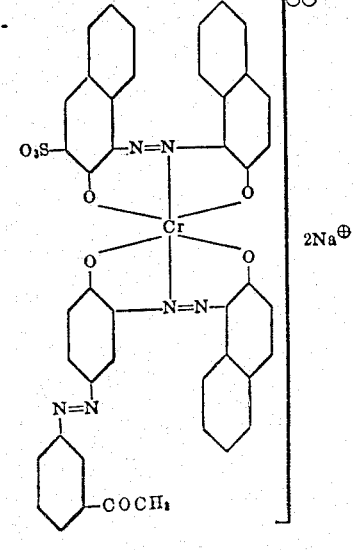 | 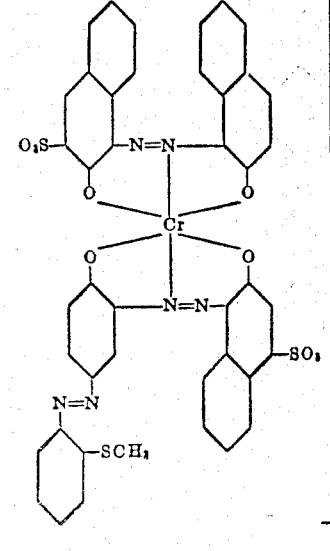 | 7.0 | 13.0 |

TABLE—Continued
| Example | Dyestuff component A | Dyestuff component B | Amounts in g. A | B |
|---|---|---|---|---|
| 26 | 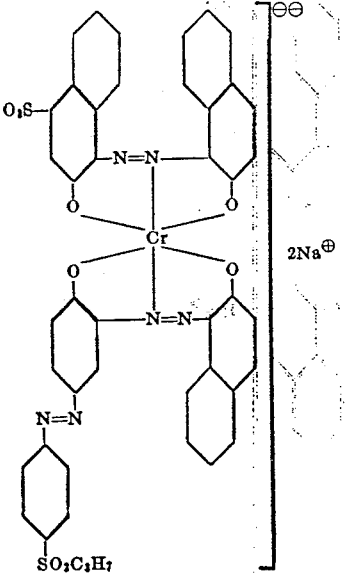 | 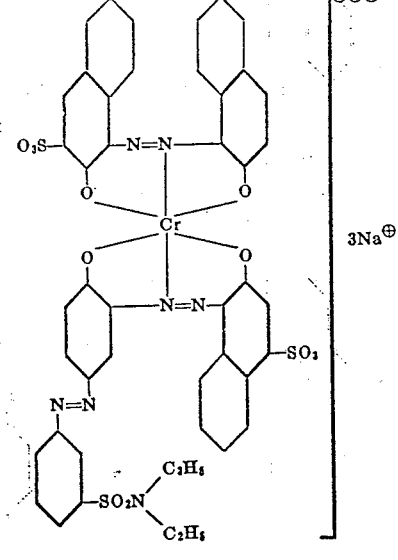 | 13.0 | 7.0 |
| 27 | 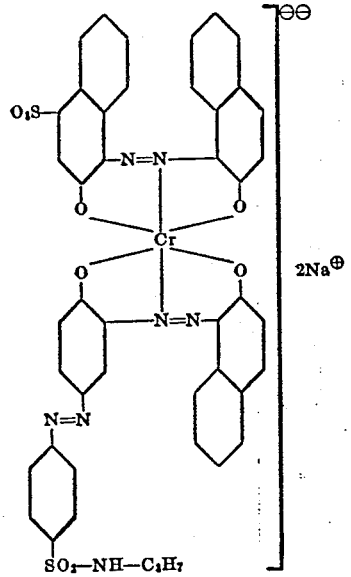 | 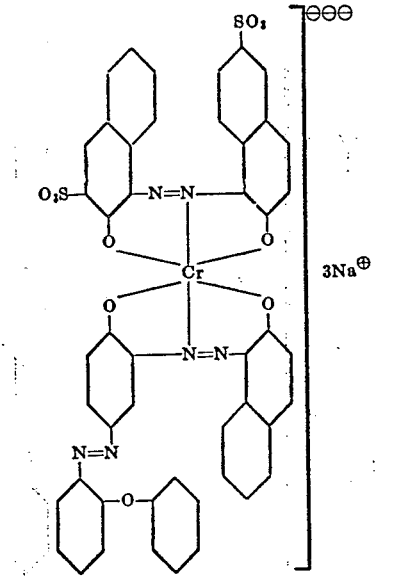 | 12.0 | 8.0 |
|  | 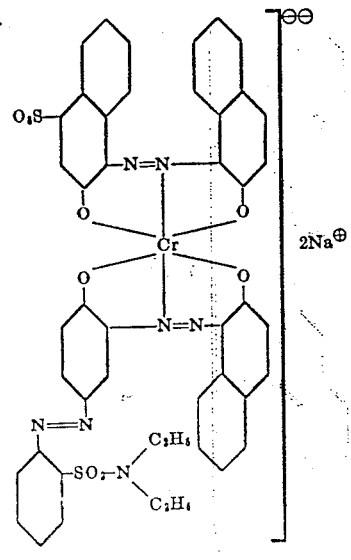 | 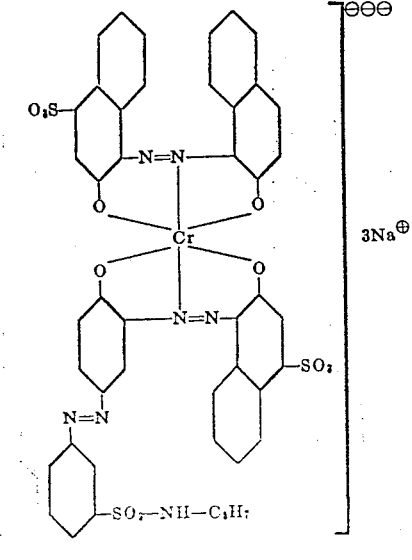 | 12.0 | 8.0 |

3,756,771
TABLE—Continued
| Example | Dyestuff component A | Dyestuff component B | Amounts in g. A | Amounts in g. B |
|---|---|---|---|---|
| 29 | 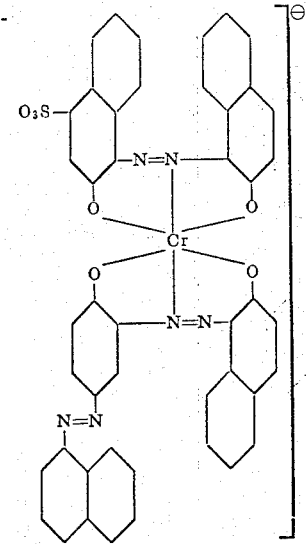 | 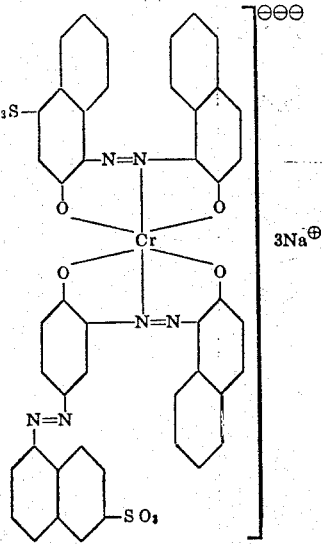 | 10.0 | 10.0 |
| 30 | 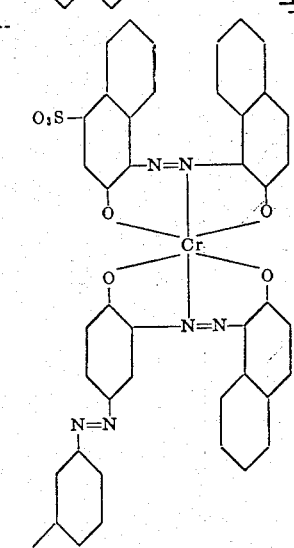 | 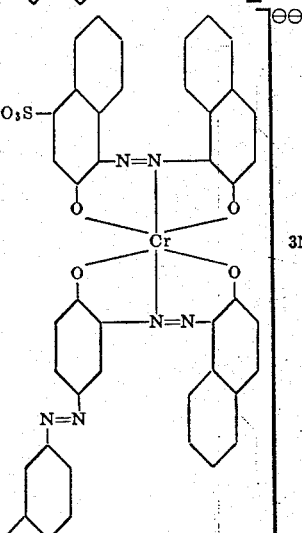 | 13.35 | 6.65 |
| 31 | 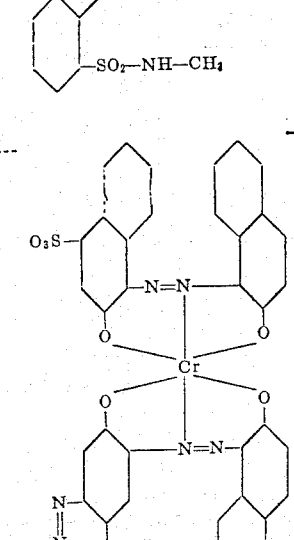 | 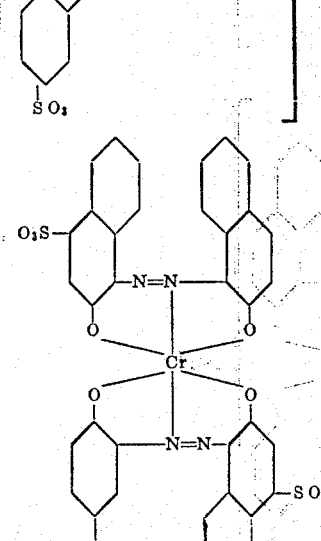 | 13.35 | 6.65 |

TABLE—Continued
| Example | Dyestuff component A | Dyestuff component B | Amounts in g. A | B |
|---|---|---|---|---|
| 32 | 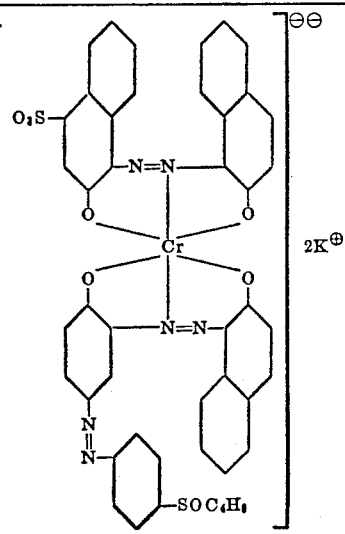 | 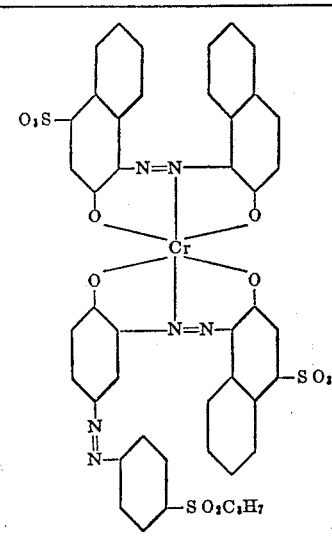 | 11.5 | 8.5 |
| 33 | 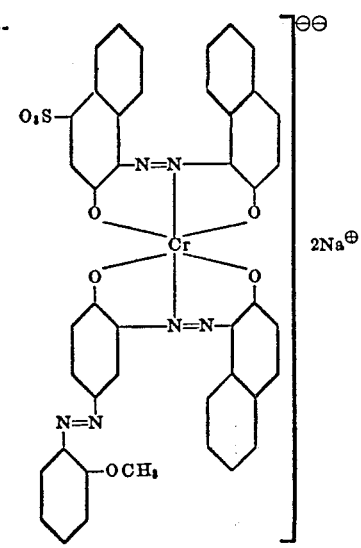 | 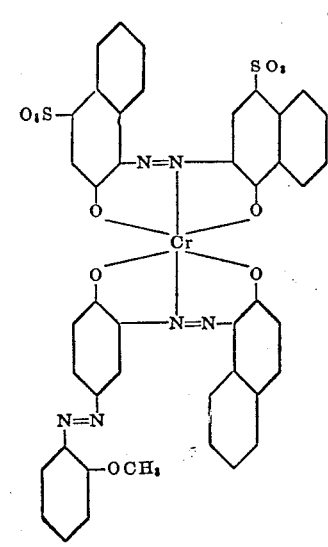 | 12.0 | 8.0 |
| 34 | 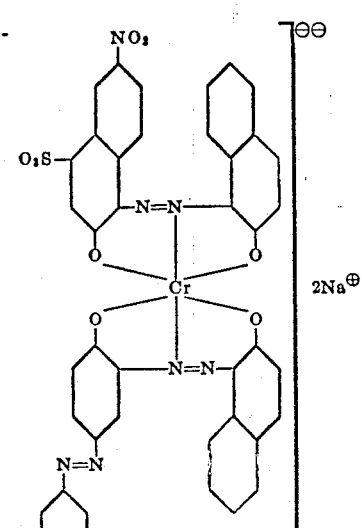 | 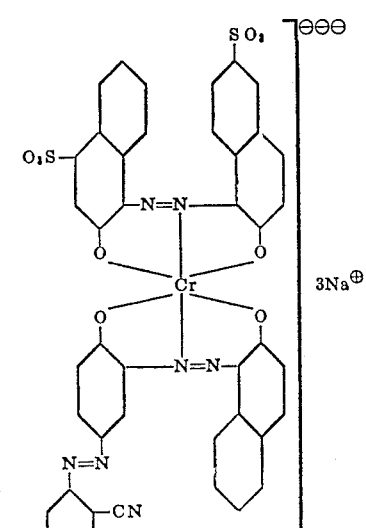 | 12.0 | 8.0 |

TABLE—Continued

| Example | Dyestuff component A | Dyestuff component B | Amounts in g. A | B |
|---|---|---|---|---|
| 35 | (structure, 2Na⊕) | (structure, 3Na⊕) | 12.0 | 8.0 |
| 36 | (structure, 2Na⊕) | (structure, 3Na⊕) | 15.0 | 5.0 |
| 37 | (structure, 2Na⊕) | (structure, 3Na⊕) | 14.0 | 6.0 |

TABLE—Continued
| Example | Dyestuff component A | Dyestuff component B | Amounts in g. A | B |
|---|---|---|---|---|
| 38 | 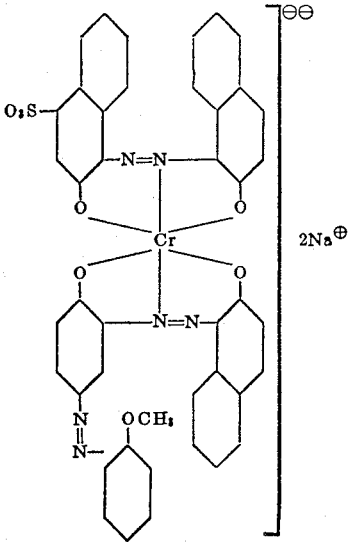 | 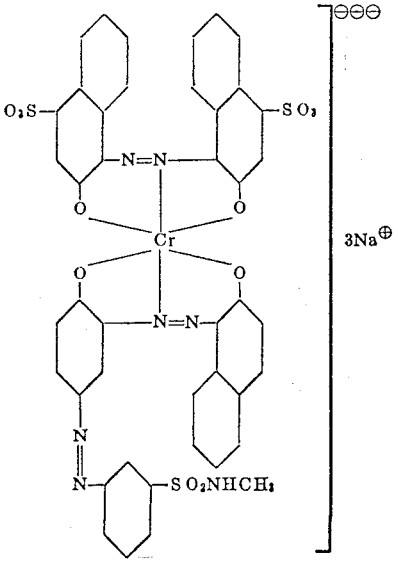 | 13.0 | 7.0 |
| 39 | 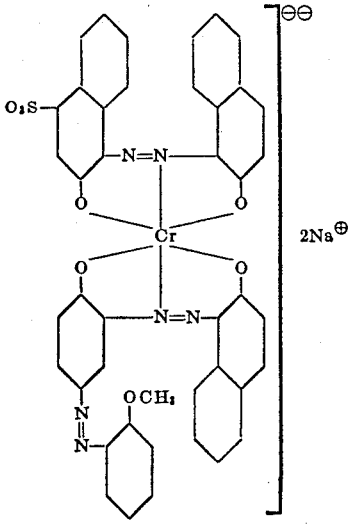 | 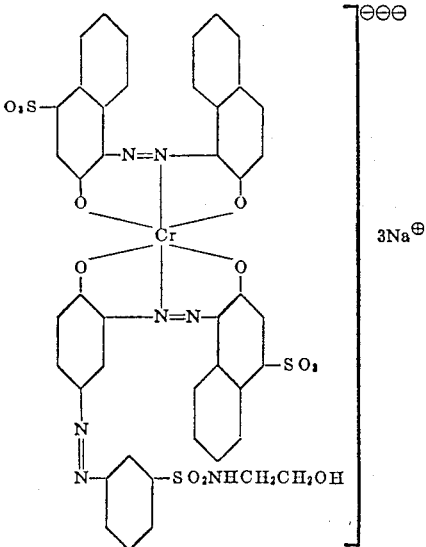 | 13.0 | 7.0 |
| 40 | 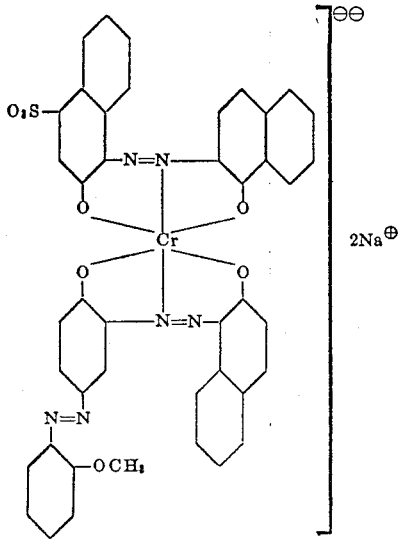 | 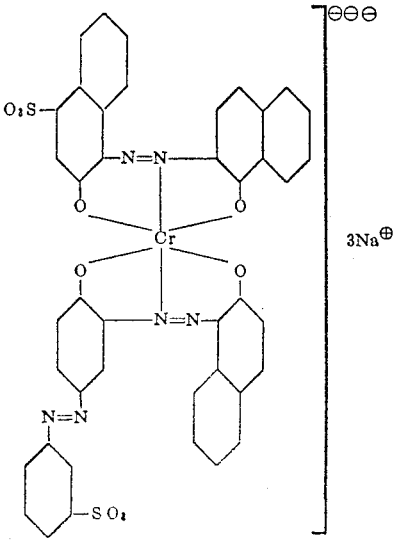 | 12.1 | 7.9 |

TABLE—Continued
| Example | Dyestuff component A | Dyestuff component B | Amounts in g. A | B |
|---|---|---|---|---|
| 41 | 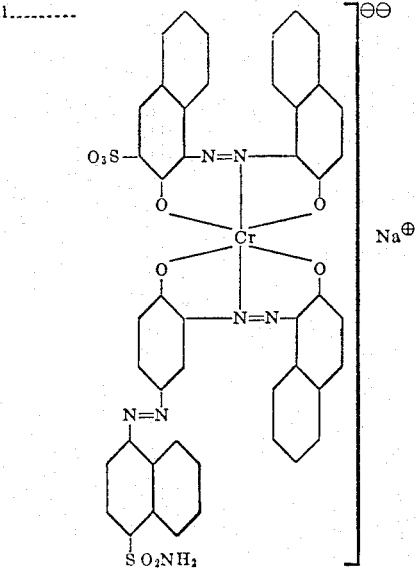 | 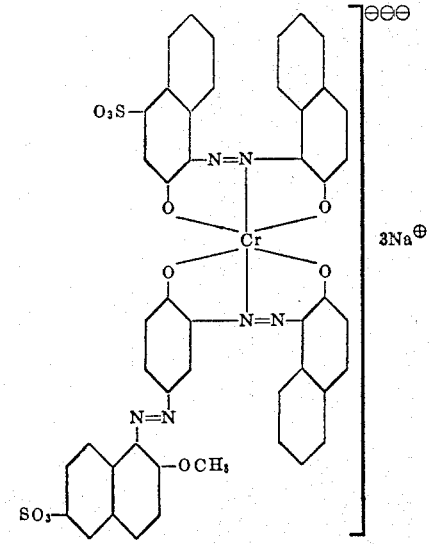 | 12.0 | 8.0 |
| 42 | 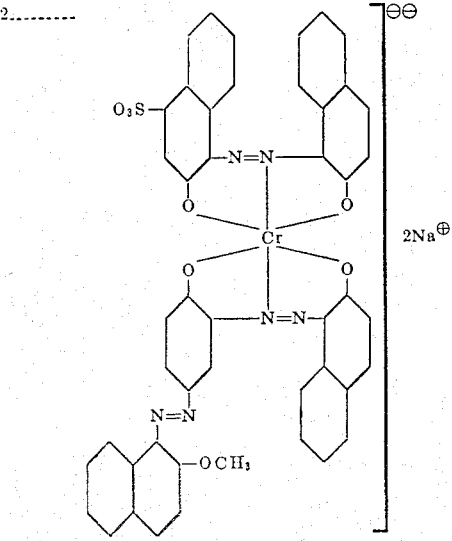 | 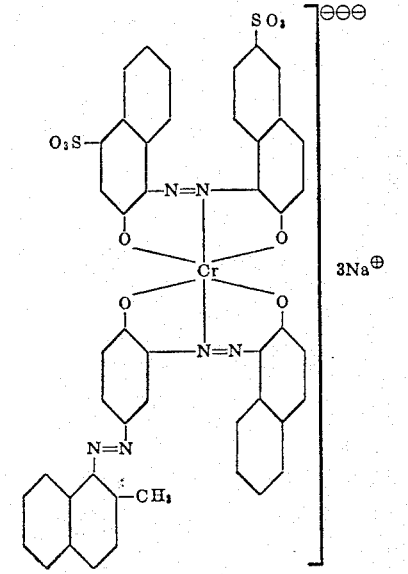 | 12.5 | 7.5 |

TABLE—Continued
| Example | Dyestuff component A | Dyestuff component B | Amounts in g. A | B |
|---|---|---|---|---|
| 43 | 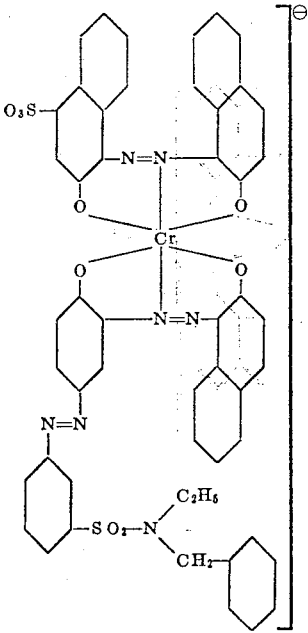 | 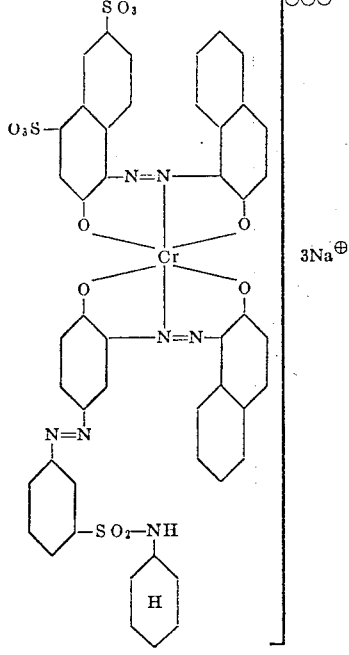 | 12.0 | 8.0 |
| 44 | 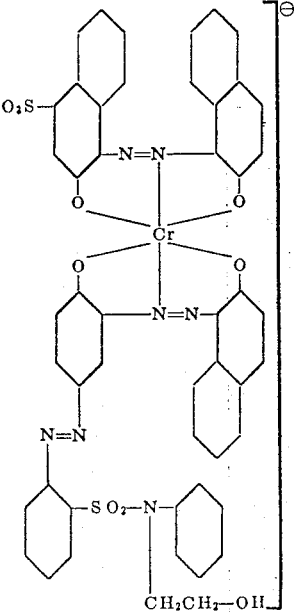 | 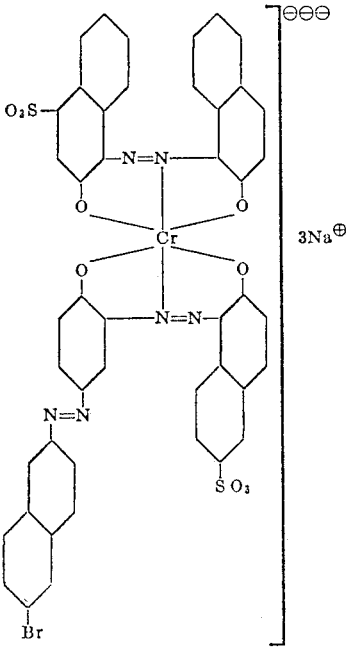 | 13.0 | 7.0 |

EXAMPLE 45

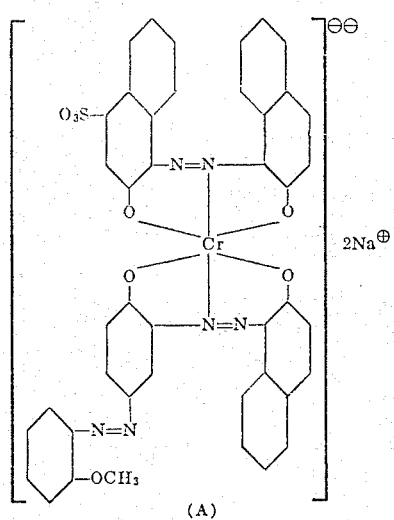

(A)

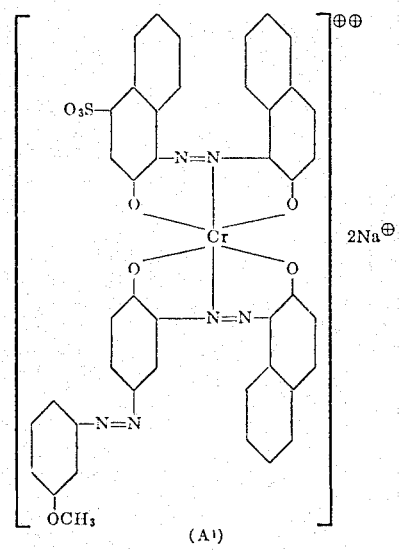

(A¹)

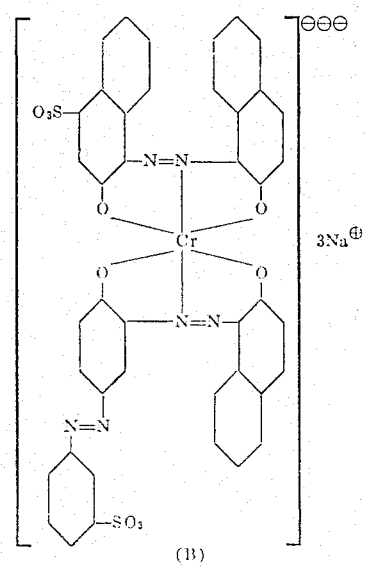

(B)

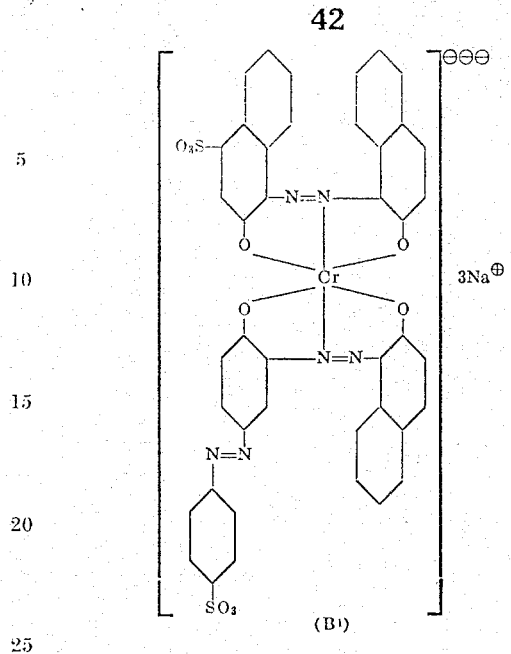

(B¹)

20 g. of a dyestuff mixture, consisting of 6.05 g. of the monosulphonated dyestuff A, 6.05 g. of the monosulphonated dyestuff A¹, 3.95 g. of the disulphonated dyestuff B and 3.95 g. of the disulphonated dyestuff B¹ of the above constitution in the form of their sodium salts, are pasted with 60 g. of urea and 50 ml. of cold water. To the resulting mixture first 300 ml. of boiling water and then 50 g. of thiodiethylene glycol, 400 g. of a crystal gum aqueous solution, 40 g. of glycerin and 15 g. of 80% acetic acid are added. The mixture obtained is made up to 1000 g. with water. With the resulting paste wool flannel is printed, steamed and washed in the usual manner. Deep black prints are obtained which are fast to light and wet processing.

The above dyestuff mixture can be produced, e.g. as follows: At about 60° 12.45 g. of the disazo dyestuff obtained from diazotised 4-hydroxy-3-amino-2'-methoxyazobenzene and 2-hydroxynaphthalene and 12.45 g. of the disazo dyestuff obtained from diazotised 4-hydroxy-3-amino-4'-methoxyazobenzene and 2-hydroxynaphthalene are suspended in 600 ml. of water and 40 g. of calcined soda together with 8.4 g. of the disazo dyestuff obtained from diazotised 4-hydroxy-3-amino-azobenzene - 3' - sulphonic acid and 2-hydroxynaphthalene and 8.4 g. of the disazo dyestuff obtained from diazotised 4-hydroxy-3-amino-azo-benzene - 4' - sulphonic acid and 2-hydroxynaphthalene. Then 44.4 g. of the 1:1 chromium complex compound corresponding to 5.2 g. of chromium and 39.4 g. of the monoazo dyestuff obtained from diazotised 1-amino-2-hydroxynaphthalene-4-sulphonic acid and 2-hydroxynaphthalene are added to the suspension. The resulting mixture is heated for one hour to 80–85°, a black suspension being formed which can be stirred well. Finally, the dyestuff mixture formed is salted out with sodium chloride, filtered and dried. The dyestuff mixture can also be isolated, after adjusting the pH of the suspension to 7.0 by the addition of hydrochloric acid, by evaporation or spray-drying.

EXAMPLE 46

4 g. of the dyestuff mixture of Example 3 containing 2.49 g. of monosulphonated chromium complex dyestuff corresponding to Formula A and 1.51 g. of disulphonated chromium complex dyestuff corresponding to Formula B, in the form of their sodium salts, are dissolved in 4000 ml. of water and, at 40–50°, 100 g. of well wetted wool flannel having acetate rayon effects are introduced into the dyebath obtained. 3 g. of 40% acetic acid are then added to the bath, the bath is brought to the boil within half an hour and kept at the boil for 45 minutes. The dyed goods are then rinsed with cold water and dried. The black wool dyeing has very good wet and light fastness properties, the acetate rayon portion being well reserved.

On using a dye liquor containing formic acid or ammonium sulphate instead of acetic acid, similar wool dyeings having good fastness properties are obtained.

If in the above example, instead of the dyestuff mixture given, 4 g. of the dyestuff mixture of Example 1 are used, a black wool dyeing is obtained wherein the acetate rayon portion is equally well reserved.

EXAMPLE 47

20 g. of the dyestuff mixture of Example 1 containing 12.1 g. of monosulphonated chromium complex dyestuff corresponding to Formula A and 7.9 g. of disulphonated chromium complex dyestuff corresponding to Formula B, in the form of their sodium salts, are mixed with 60 g. of urea and the mixture is slurried with 50 ml. of cold water. 330 ml. of boiling water are poured in, 50 g. of thiodiethylene glycol, 400 g. of a 25% crystal gum solution, 40 g. glycerin, 10 g. of 80% acetic acid and 30 g. of a mixture of 35 parts of N-methyl-N,N-bis-(β-hydroxyethyl)-amine salt of coconut oil fatty acid, 35 parts of lauryl alcohol pentaglycol ether and 30 parts of coconut oil fatty acid-N,N-bis-(β-hydroxyethyl)-amide are added. The mixture is then made up to 1000 g. with water.

Wool muslin is printed in the usual way with the paste so obtained and then steamed and washed. Full, light and wet fast prints are obtained.

Prints having similar properties are obtained if, with otherwise the same procedure, instead of 30 g. of the dyestuff carrier mixture mentioned in the example, 30 g. of a dyestuff carrier mixture consisting of 9 parts of the sodium salt of sulphated lauryl alcohol diglycol ether, 9 parts of coconut oil fatty acid-N,N-bis-(β-hydroxyethyl)-amide and 2 parts of isopropanol are used.

EXAMPLE 48

Glove leather, fulled and chrome tanned in the usual way, is dyed on the table as follows:

To prevent the dyestuff penetrating through the leather, the underside is brushed with a solution of 50 g./litre of potash alum (potassium-aluminum sulphate). A dyestuff solution containing 20 g./litre of the dyestuff mixture according to Example 1, 30 g./litre of potato starch and 25 ml. of 80% acetic acid, is applied 2-3 times with a brush to the grain side of the leather, the leather being set out after each application. The grain side of the leather is then rinsed with water whilst the underside of the leather is set out.

The goods are then dried and prepared in the usual way. In this way, a level, deep black dyeing on glove leather having a white underside is obtained.

EXAMPLE 49

20 g. of the dyestuff mixture according to Example 1 are slurried in 60 g. of cold water and then dissolved while heating by pouring in 890 g. of hot water.

To this solution 10 g. of a thickener (Solvitose OFA), previously slurried in a small amount of ethyl alcohol, are added while stirring. After the thickener has been dissolved, the solution is cooled to 50°. Then 20 g. of a carrier mixture consisting of 10 parts of coconut oil fatty acid-N-methyl-N-β-hydroxyethyl amide, 10 parts of the sodium salt of dodecyl benzene sulphonic acid and 2 parts of isopropanol as well as 10 g. of 80% acetic acid and 10 g. of water are added.

Wool slubbing is padded at 50° with the resulting pad liquor and squeezed out on a foulard to a pick-up of about 105% calculated on the dry weight of the goods. Then the slubbing is steamed during 15 minutes with saturated steam at 100-102°. After steaming, the dyeing is rinsed with warm water of about 40° and then washed at 40° with an aqueous solution containing 1 g. per litre of nonylphenol polyglycol ether, again rinsed and dried. Wool slubbing dyed black is obtained.

What I claim is:

1. A composite dye consisting essentially of at least one dyestuff of the formula

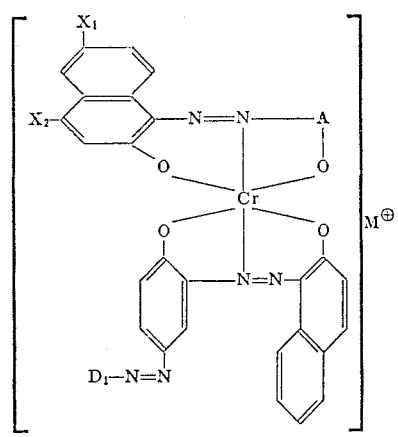

(I)

and at least one dyestuff of the formula

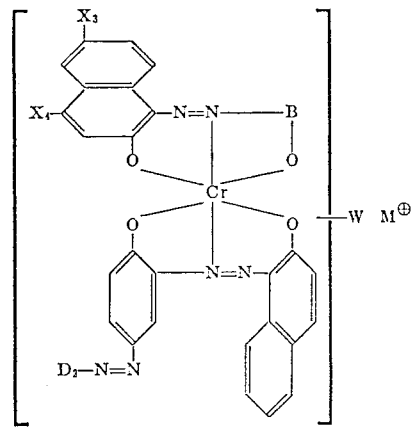

(II)

in a weight ratio of from about 2:1 to 1:2, in which formulae

A and B each represent a 1,2-naphthylene radical;

$D_1$ and $D_2$ each represent a phenyl radical which is unsubstituted or is substituted by lower alkyl of at most 2 carbon atoms, lower alkoxy of at most 2 carbon atoms, chlorine, bromine, or fluorine;

$X_1$ and $X_3$ each represent hydrogen or nitro;

W is linked to $D_2$; $X_2$, $X_4$, and W each represent $-SO_3^-M^+$;

and $M^+$ represents lithium, sodium, potassium, or ammonium.

2. A composite dye as defined in claim 1, which consists essentially of dyestuff of formula
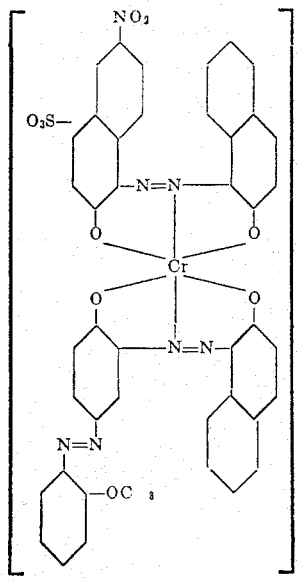
and dyestuff of formula
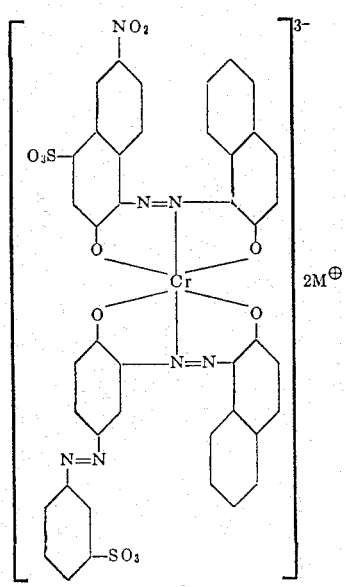
wherein M⊕ represents lithium, sodium, potassium and ammonium.
3. A composite dye as defined in claim 1, which consists essentially of dyestuff of formula
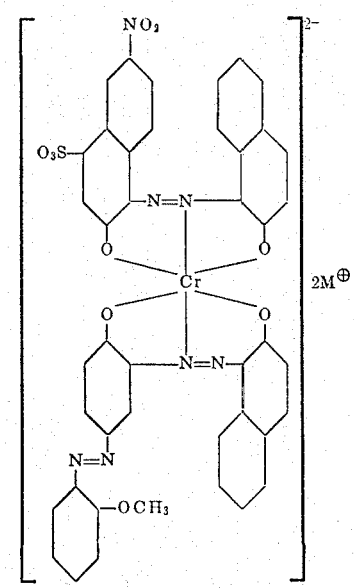
and dyestuff of formula:
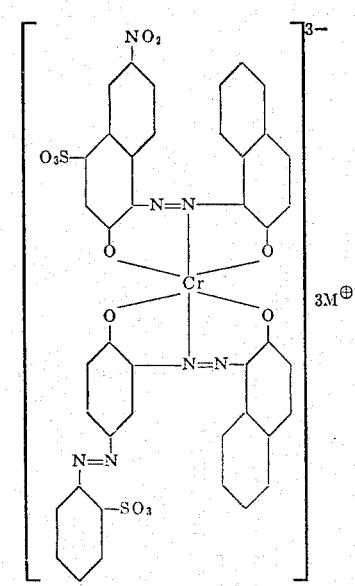
wherein M⊕ represents lithium, sodium, potassium and ammonium.

4. A composite dye as defined in claim 1, which consists essentially of dyestuff of formula

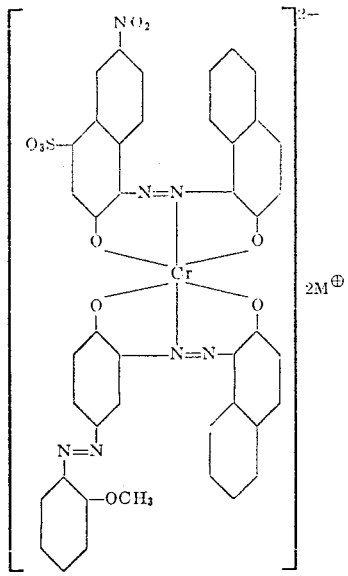

and dyestuff of formula

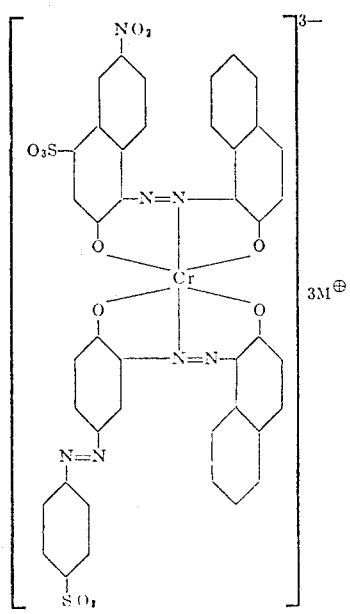

wherein $M^{\ominus}$ represents lithium, sodium, potassium and ammonium.

5. A composite dye as defined in claim 1, which consists essentially of dyestuff of formula

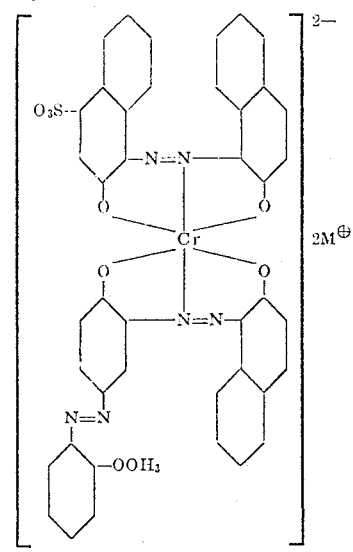

and dyestuff of formula

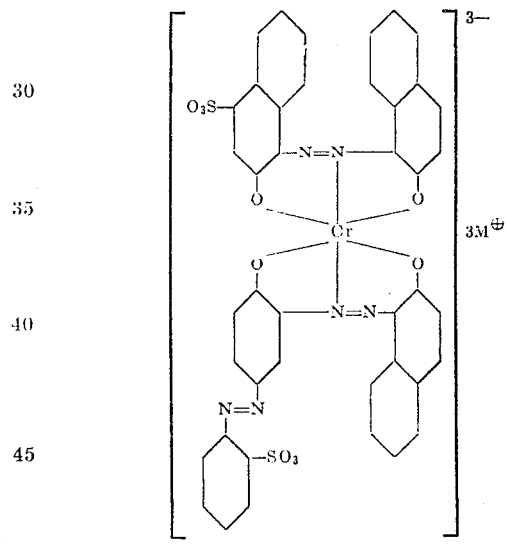

wherein $M^{\oplus}$ represents lithium, sodium, potassium and ammonium.

6. A composite dye as defined in claim 1, which consists essentially of dyestuff of formula

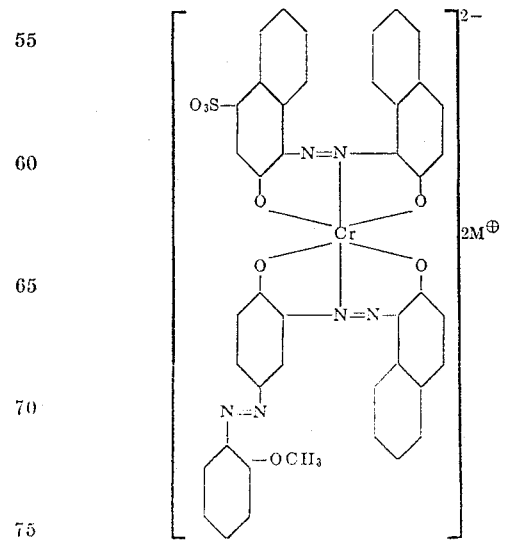

and dyestuff of formula

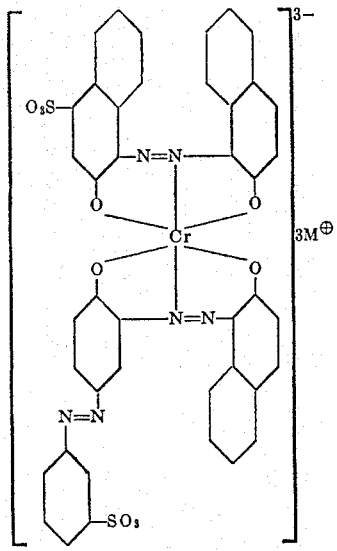

wherein M⊕ represents lithium, sodium, potassium and ammonium.

7. A composite dye as defined in claim 1, which consists essentially of dyestuff of formula

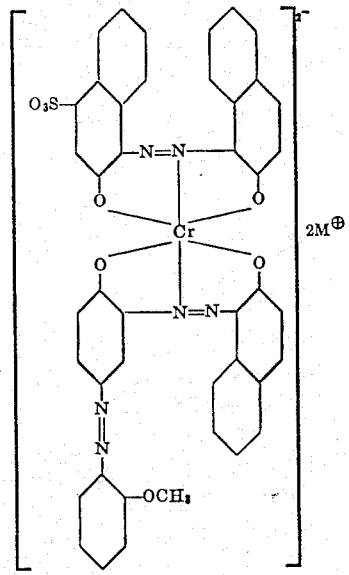

and dyestuff of formula

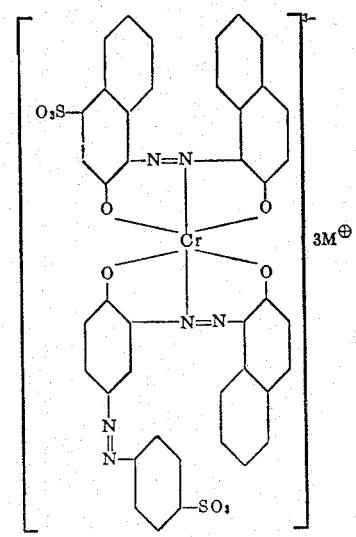

wherein M⊕ represents lithium, sodium, potassium and ammonium.

8. A composite dye as defined in claim 1, which consists essentially of dyestuff of formula

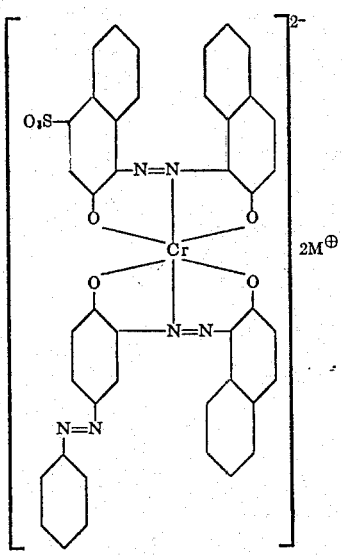

and dyestuff of formula

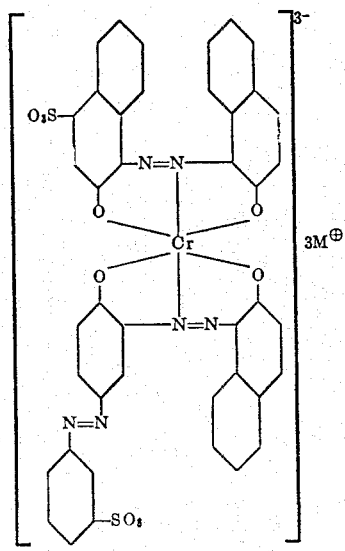

wherein M⊕ represents lithium, sodium, potassium and ammonium.

9. A composite dye as defined in claim 1, which consists essentially of dyestuff of formula
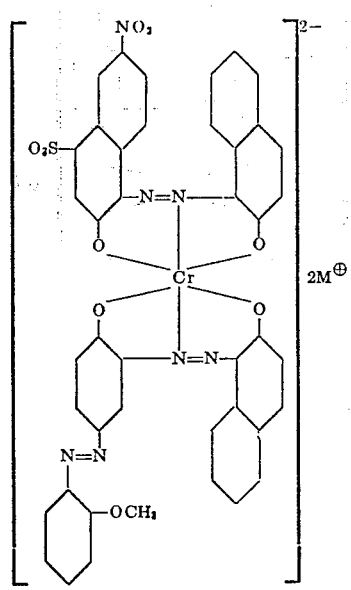
and dyestuff of formula
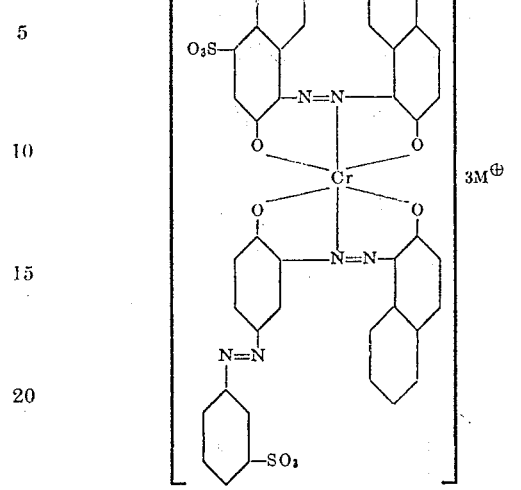
wherein $M^\oplus$ represents lithium, sodium, potassium and ammonium.
References Cited
UNITED STATES PATENTS
2,933,488  4/1960  Biedermann et al. ____ 260—145
2,933,489  4/1960  Biedermann et al. ____ 8—43 X
GEORGE F. LESMES, Primary Examiner
P. C. IVES, Assistant Examiner
U.S. Cl. X.R.
8—13, 71, 41 B; 260—145

UNITED STATES PATENT OFFICE
CERTIFICATE OF CORRECTION

Patent No. 3,756,771    Dated September 4, 1973

Inventor(s) Fabio Beffa

It is certified that error appears in the above-identified patent and that said Letters Patent are hereby corrected as shown below:

Correct the assignee's name to read

-- Ciba-Geigy AG --

Signed and sealed this 15th day of January 1974.

(SEAL)
Attest:

EDWARD M. FLETCHER, JR.          RENE D. TEGTMEYER
Attesting Officer                Acting Commissioner Of Patents